United States Patent [19]

Jacobs

[11] 4,127,256
[45] Nov. 28, 1978

[54] FLAME-CUTTING APPARATUS

[75] Inventor: Hans Jacobs, Leverkusen, Germany

[73] Assignee: J.U.W. Muller, Maschinen und Amaturenfabrik GmbH, Leverkusen, Germany

[21] Appl. No.: 833,071

[22] Filed: Sep. 13, 1977

[30] Foreign Application Priority Data

Sep. 25, 1976 [DE] Fed. Rep. of Germany ....... 2643268

[51] Int. Cl.² ............................................. B23K 7/04
[52] U.S. Cl. ........................................ 266/57; 266/61
[58] Field of Search ................... 266/54, 56, 57, 58, 266/61, 64

[56] References Cited

U.S. PATENT DOCUMENTS 2,384,128  9/1945  Nation ................................. 266/57

FOREIGN PATENT DOCUMENTS 1,013,738  12/1965  United Kingdom ................... 266/57

Primary Examiner—Roy Lake
Assistant Examiner—Paul A. Bell
Attorney, Agent, or Firm—Haseltine, Lake & Waters

[57] ABSTRACT

A flame-cutting apparatus comprising a burner guided for movement around a rotating pipe to travel along a curved path along the surface of the pipe corresponding to the line of intersection of two pipes. The burner is pivotably supported on a guide for movement about an axis perpendicular to the axis of the jet flame of the burner. A template corresponding to a chamfer to be produced in the surface of the element being cut by the jet flame includes two parts, one being pivotable with respect to the other about an axis common to both parts. A scanner rotates at an angular velocity corresponding to the angular velocity of rotation of the pipe being cut and the template is resiliently urged against the scanner to be axially displaced thereby and to transmit such displacement through a mechanism to effect pivotal movement of the burner to produce the desired chamfer of the cut edge of the pipe.

10 Claims, 5 Drawing Figures

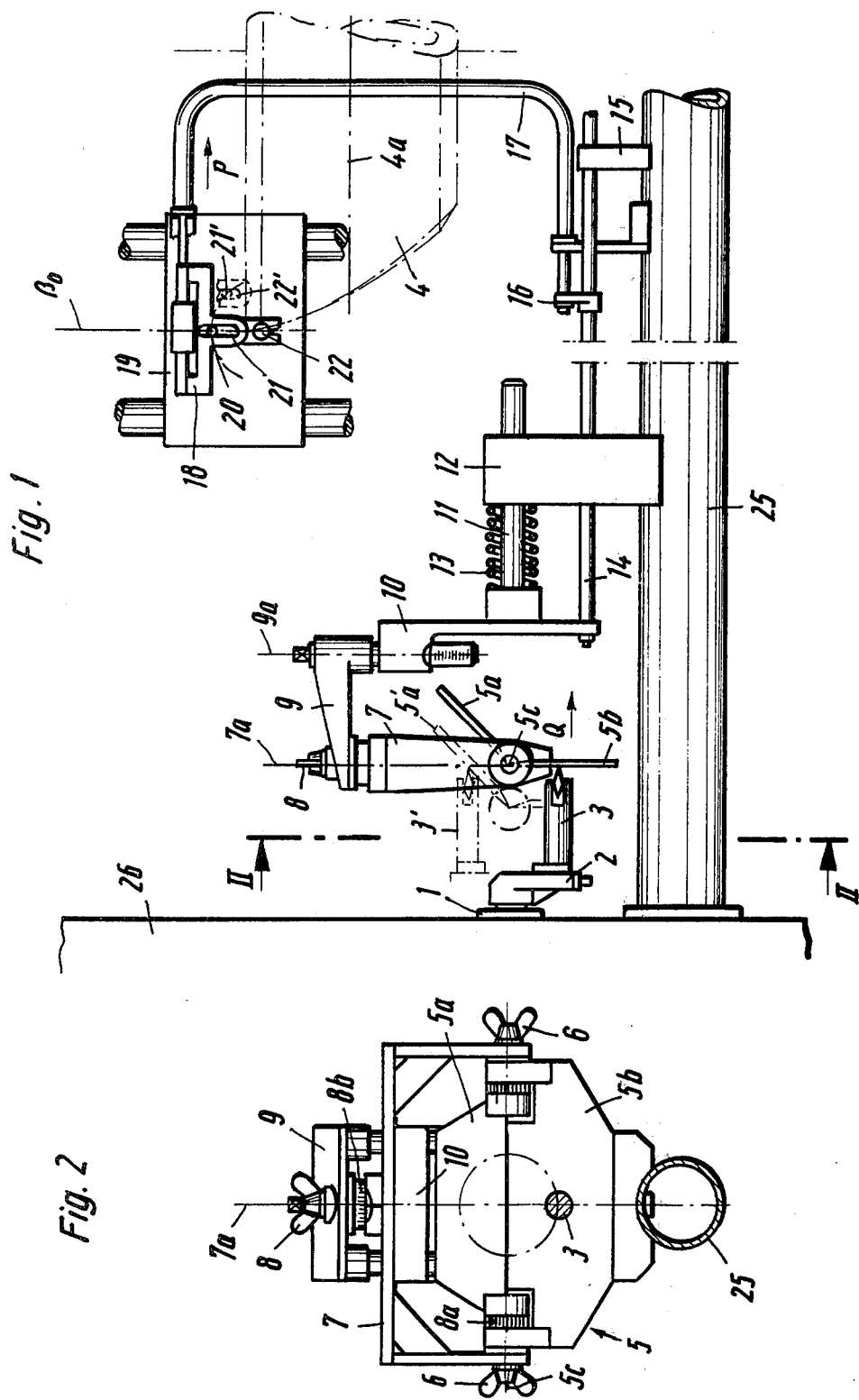

FLAME-CUTTING APPARATUS

FIELD OF THE INVENTION

The invention relates to flame-cutting apparatus including a burner which is guided along the curve of intersection of two pipes while being simultaneously pivoted around an axis transverse to the axis of the flame jet by means of a template corresponding to a desired chamfer on the cutting surface.

PRIOR ART

A conventional guiding movement by hand of the burner to produce the chamfer proves to be very difficult and not sufficiently exact in practice. Control of the pivoting angle of the burner by means of an eccentric is only possible for limited pivotal angles and is only possible in the case where the axes of both pipes intersect one another.

It has been proposed to pivot the burner by a template corresponding to the respective chamfer but this is very expensive as special templates have to be produced for all different conditions.

SUMMARY OF THE INVENTION

An object of the invention is to provide a device which pivots a burner, when it is guided by means of a template as the burner travels along the curve of intersection of two pipes, the burner being pivoted around an axis which is perpendicular to the flame jet axis according to the desired chamfer at the cutting surface, said template not necessarily requiring replacement when pipes of different types or pipes which intersect at different angles are to be cut.

This object is achieved according to the invention in that the template is composed of two parts, one part being adapted to be pivoted in relation to the other part around an axis which is common to the surfaces of both said parts.

The burner is preferably connected at a distance from its pivot axis to an element which is only movable in a predetermined direction, said element being connected to said template such that the template transfers its movement to said element, said template yieldingly abutting a scanner which travels around on axis, which is parallel to the direction of relative movement of said template and said scanner, at the same angular velocity as that at which the burner is guided around the axis of said pipe. The device may also comprise a guide element for moving said template in a direction parallel to the axis of the pipe being cut. The entire template may be rotated around an axis which is perpendicular to the axis common to the surfaces of both parts of said template.

BRIEF DESCRIPTION OF THE DRAWINGS

FIG. 1 is an elevational view of the device.
FIG. 2 is a section taken on line II-II in FIG. 1.

DETAILED DESCRIPTION

Figure 5:
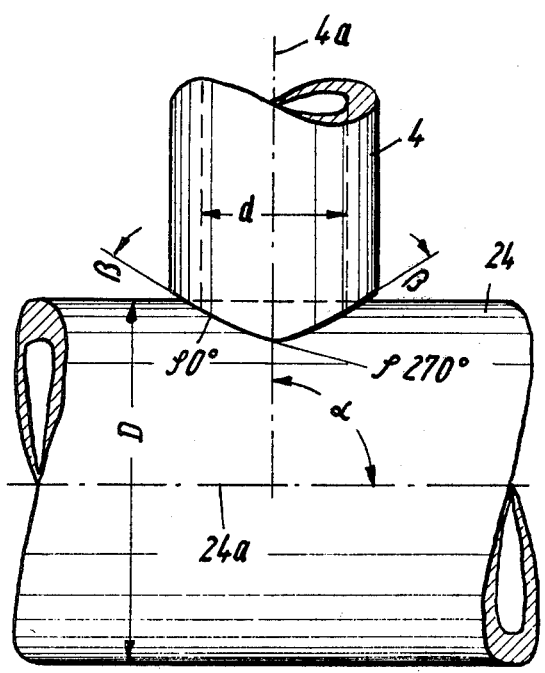
FIGS. 4 and 5 show the pipe represented in FIGS. 1 and 3 together with a pipe into which it extends.

The drawing shows a device according to the invention for the case where a cutting burner 23 cuts the end of a pipe 4 along the length of the curve of intersection of this pipe with a pipe 24 (see FIGS. 4 and 5) in such a manner that the angle $\beta$ of the cut surface F of the pipe 4 in relation to the surface of the pipe 24 is constantly so great that on welding the pipe 4 to the pipe 24 the gap formed between these surfaces can hold a sufficiently large amount of welding material. Stated otherwise, the burner 23 forms an angle with the end of pipe 4 to form a chamfer at the cut surface. In order to achieve this, while the pipe 4 is being revolved around its axis 4a, the burner 23 is moved in a direction parallel to the axis 4a by means of a burner carriage 19 at such a velocity that the tip of the burner flame travels along a path corresponding to the curve of intersection of the pipe 4 with the pipe 24. This axial movement of carriage 19 is effected by suitable means (not shown) whose operation is outside the scope of the present invention and whose construction is not relevant thereto. Solely by way of observation the movement of guide 19 can be effected by a motor driven at a variable speed to achieve the requisite velocity of the carriage so that the burner tip travels along the required path. The burner 23 can be pivoted around an axis 22 which lies perpendicular to the radial plane of the pipe. This pivoting movement of the burner 23 is controlled by a template 5.

The template is composed of two parts 5a, 5b, part 5a being pivotable in relation to part 5b around an axis 5c which is parallel to that diagonal plane of the pipe 4 which lies perpendicular to the plane in which the sliding carriage 19 is being moved. The template 5 is carried by a frame 7. The angular setting of the template part 5a can be fixed in relation to the template part 5b by means of wing nuts 6 arranged on the frame 7. The frame 7 is disposed in a bearing arm 9 in such a manner that it can be pivoted around an axis 7a which is perpendicular to axis 5c. The frame 7 can be fixed by means of wing nuts 8 in any angular position desired. Scales 8a and 8b are provided to simplify the angular adjustments around axes 5c and 7a respectively.

The arm 9 is supported by a bearer member 10 such that the arm can be displaced in relation to the member 10 around an axis 9a which is parallel to axis 7a. The arm 9 can be fixed in whatever axial position desired in member 10 so that the frame 7 can be displaced in the direction of axis 7a by such a displacement and thereby the template 5 can be displaced therewith.

The bearer member 10 is securely connected to a rod 14 which is disposed in bearings 12 and 15 such that rod 14 can be shifted in the direction of its axis. The bearings 12 and 15 are secured on a pipe 25 which is attached parallel to the pipe 4 at the frame 26 of the device. One end 16 of a Bowden cable 17 is connected to the rod 14, the other end of the cable being secured to a slide 18 which can slide on the burner carriage 19 in a direction parallel to the axis 4a of the pipe 4. This slide has an elongated slot 21 which lies in a radial plane of the pipe 4. A pin 20 connected to the burner 23 is engaged in the elongated slot 21.

Figure 3:
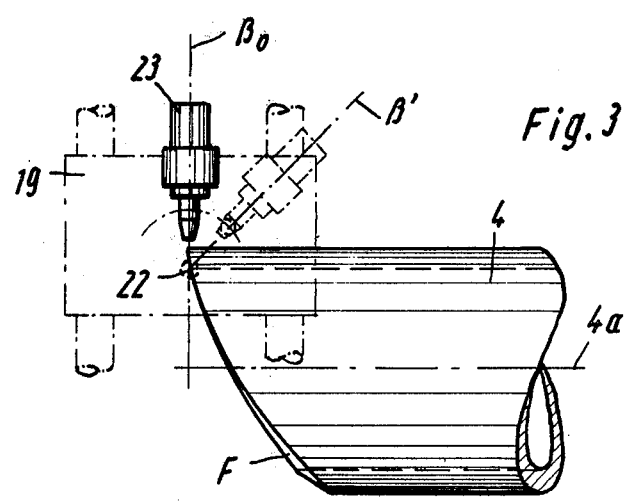
FIG. 3 shows the pipe to be cut and the burner in a position corresponding to FIG. 1.

By moving the template 5 in the direction of the arrow Q, the pin 20 is moved in the direction of the arrow P and the burner is pivoted around the tip of the burner 22, e.g. from angular position $\beta_o$ to angular position $\beta_1$ (see FIG. 3). The template 5 is moved in the direction Q by means of a scanner 3 which is rotated by a shaft 1, which is parallel to the axis 4a of the pipe 4 and therefore also parallel to the axis of the pipe 25, at the same velocity as that at which the pipe 4 is rotated around its axis in relation to the burner carriage 19 and therefore in relation to the burner 23. The template 5 is constantly pressed against the rotating scanner 3 by means of a spring 13 which encircles a bolt 11 which is attached to bearing member 10, and slides in a bore of the bearing 12. The assembly of member 10, bolt 11, spring 13, rod 14 and cable 17 form part of a follower mechanism for transmitting movement to the burner in accordance with the movement of the plate 5 as produced by the relative angular position of parts 5a and 5b.

In the same manner that the end of the pipe 4 can be cut with the device along a path corresponding to the curve of intersection with pipe 24 and with the desired welding chamfer F, the corresponding opening can also, of course, be cut in the wall of the pipe 24.

Figure 4:
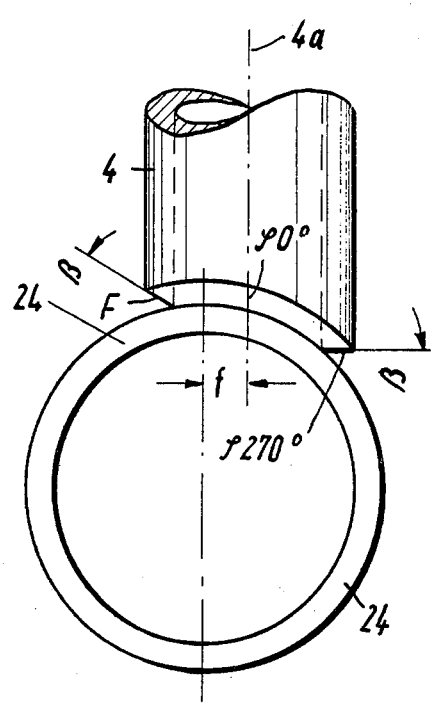

FIGS. 4 and 5 show a pipe 4 which intersects the pipe 24 at an eccentricity f. The angle α between the axes 4a and 24a of pipes 4 and 24 can be as large as desired. Yet, the end of pipe 4 and the opening in pipe 24 can be easily cut with the apparatus of the invention and with the desired chamfer.

Numerous modifications and variations of the disclosed embodiment can be made within the scope and spirit of the invention as defined by the attached claims.

What is claimed is:

1. In flame cutting apparatus having a burner with an axial jet flame, the burner being guided for movement along a curved path corresponding to the line of intersection of two pipes: the provision of means for pivotably moving said burner around an axis perpendicular to the axis of said jet flame including a template corresponding to a chamfer to be produced in the surface of the element being cut by the jet flame, said template including two parts, one being pivotably movable with respect to the other about an axis common to the surfaces of both parts, and follower means for pivotably moving the burner in correspondence with the angular position of said parts of the template.

2. Apparatus as claimed in claim 1 comprising a rotatable scanner rotated about an axis at an angular velocity equal to the relative angular velocity of a pipe being cut and the burner, said follower means comprising means resiliently urging said template against said scanner for yieldable movement along an axis parallel to the axis of rotation of said scanner, and means for transmitting movement of said template for pivotably moving the burner.

3. Apparatus as claimed in claim 2 wherein said burner has a pivot axis, said means for transmitting movement of said template for pivotably moving the burner comprises an assembly movable in a predetermined direction for pivoting said burner about its pivot axis.

4. Apparatus as claimed in claim 3 comprising guide means for guiding the movement of the template in a direction parallel to the axis of rotation of said scanner.

5. Apparatus as claimed in claim 3 comprising means for turning said template about an axis perpendicular to the axis common to both surfaces of the template.

6. Apparatus as claimed in claim 5 comprising means for displacing said template in a direction parallel to said axis which is perpendicular to the axis common to both parts of the template.

7. Apparatus as claimed in claim 3 wherein a carriage carries said burner, said assembly comprising a slide slidably mounted on said carriage, said slide having an elongated slot, and a pin slidably mounted in said slot and secured to said burner at a distance from the pivot axis of the burner.

8. Apparatus as claimed in claim 7 wherein said follower means comprises a cable connected to said slide for transmitting movement thereto corresponding to the yieldable movement of the template.

9. Apparatus as claimed in claim 1 wherein said parts of the template are flat.

10. Apparatus as claimed in claim 1 comprising indicator means for displaying the angular relation between said parts of the template.

* * * * *